(12) United States Patent
Modica et al.

(10) Patent No.: US 12,465,964 B2
(45) Date of Patent: Nov. 11, 2025

(54) METHOD FOR RECYCLING SCRAP GLASS FROM EXHAUSTED PHOTOVOLTAIC PANELS

(71) Applicant: NUOVA RAECYCLE S.R.L., Syracuse (IT)

(72) Inventors: Giovanni Modica, Syracuse (IT); Piervittorio Luigi Trebucchi, Syracuse (IT)

(73) Assignee: NUOVA RAECYCLE S.R.L., Syracuse (IT)

( * ) Notice: Subject to any disclaimer, the term of this patent is extended or adjusted under 35 U.S.C. 154(b) by 54 days.

(21) Appl. No.: 18/578,961

(22) PCT Filed: Jul. 11, 2022

(86) PCT No.: PCT/IB2022/056379
§ 371 (c)(1),
(2) Date: Jan. 12, 2024

(87) PCT Pub. No.: WO2023/285941
PCT Pub. Date: Jan. 19, 2023

(65) Prior Publication Data
US 2024/0326110 A1    Oct. 3, 2024

(30) Foreign Application Priority Data

Jul. 15, 2021 (IT) .................. 102021000018671

(51) Int. Cl.
*B09B 3/35* (2022.01)
*B09B 3/21* (2022.01)
(Continued)

(52) U.S. Cl.
CPC ............. *B09B 3/35* (2022.01); *B09B 3/21* (2022.01); *B09B 3/27* (2022.01); *B09B 3/29* (2022.01);
(Continued)

(58) Field of Classification Search
CPC .. B09B 2101/15; B09B 2101/50; C22B 7/008
See application file for complete search history.

(56) References Cited

U.S. PATENT DOCUMENTS 8,821,711 B2 * 9/2014 Taylor .................... C22B 17/02
423/508
10,618,268 B2 * 4/2020 Kernbaum ............. H10F 19/00
(Continued)

FOREIGN PATENT DOCUMENTS

EP    2455500 A1    5/2012
EP    3178576 B1 *  9/2020  ............. B09B 3/70
(Continued)

OTHER PUBLICATIONS

Translation of EP-3178576-B1 (Year: 2020).*
(Continued)

*Primary Examiner* — Jacob J Cigna
(74) *Attorney, Agent, or Firm* — Maier & Maier, PLLC

(57) ABSTRACT

A method for recycling glass scrap from exhausted photovoltaic panels containing organic and substantially lead-free contaminants which allows obtaining industrial-degree liquid sodium silicates and mixed inorganic silicates insoluble in water and in alkaline solutions having a high number of industrial applications. The embodiments also relate to soluble and insoluble silicates obtained by such a method.

17 Claims, 2 Drawing Sheets

(51) Int. Cl.
  *B09B 3/27*   (2022.01)
  *B09B 3/29*   (2022.01)
  *B09B 3/40*   (2022.01)
  *B09B 3/70*   (2022.01)
  *B09B 101/15*   (2022.01)
  *B09B 101/50*   (2022.01)

(52) U.S. Cl.
  CPC .................. *B09B 3/40* (2022.01); *B09B 3/70* (2022.01); *B09B 2101/15* (2022.01); *B09B 2101/50* (2022.01)

(56) References Cited

U.S. PATENT DOCUMENTS

| | | |
|---|---|---|
| 12,084,352 B2 * | 9/2024 | Pirie .................... C03C 4/0035 |
| 2017/0275734 A1 | 9/2017 | Modica |
| 2024/0042503 A1 * | 2/2024 | Brandhorst, Jr. ......... B09B 3/70 |

FOREIGN PATENT DOCUMENTS

| | | | |
|---|---|---|---|
| WO | WO-2014184816 A1 * | 11/2014 | ............ C22B 7/006 |
| WO | 2017162757 A1 | 9/2017 | |
| WO | WO-2018164578 A1 * | 9/2018 | ............... C22B 3/26 |

OTHER PUBLICATIONS

International Search Report and Written Opinion of the International Searching Authority, issued Oct. 14, 2022, in corresponding International Application No. PCT/IB2022/056379, 7 pages.

* cited by examiner

METHOD FOR RECYCLING SCRAP GLASS FROM EXHAUSTED PHOTOVOLTAIC PANELS

TECHNICAL FIELD

The present invention refers to the recycling of glass scrap, substantially lead-free, in particular deriving from the disposal of photovoltaic panels, for the recovery of disposed photovoltaic panels with production of soluble and insoluble silicates.

BACKGROUND

Photovoltaic panels represent a strategic resource in the so-called energy transition, i.e. in the transition from the use of non-renewable energy sources, mainly consisting of fossil hydrocarbons, to the exploitation of renewable energy sources.

The massive installation that has been promoted since the 90's of the twentieth century will soon result in the need to dispose of a large amount of exhausted photovoltaic panels. The service life of photovoltaic panels is in fact estimated at around 25-30 years, after which the panel must be replaced because it is no longer productive. Early replacements may be desirable due to the availability of newly developed photovoltaic panels with higher efficiency, while a portion of panels must be replaced early due to failures or damages. It is estimated that around 1 billion photovoltaic panels are currently installed in Europe, for a total mass of 25 million tonnes of material to be recycled.

The correct disposal of the panels is therefore an integral part of the challenge of the energy transition. However, as explained in detail below, such disposal is not easy and presents considerable technical difficulties.

The most common photovoltaic panels are obtained by hot lamination of a plurality of different layers. The following is a step-by-step description of a generic construction process for a common photovoltaic panel. First of all, a first layer representing a substrate with low thermal expansion is provided. This can be made of low-quality glass or polymer, e.g. PVF (Poly Vinyl Fluoride). On the substrate, an EVA (Ethylene Vinyl Acetate) film is spread, on which the actual silicon photovoltaic cells are placed, complete with the relative conductive metal tracks. Typically, the conductive tracks can be made of copper, aluminium or silver. Over the photovoltaic cells, a further layer of EVA film is then spread and lastly a final layer of top-quality, high-transmittance tempered glass. The resulting sandwich is pressed under heat (approx. 150° C.) so that the EVA films become fluid and completely seal all the components of the panel. The panel is then enclosed in a structural frame, typically made of aluminium, which has the function of sealing, protecting and stiffening the panel. Thus, an ordinary panel weighing about 21 kg contains about 15 kg of glass, 2.8 kg of plastic (EVA and PVF), 2 kg of aluminium, 1 kg of silicon powder and 0.14 kg of copper. The present discussion focuses, in particular, on the recovery of the top-quality glass (so-called extra-clear) of the covering layer, which glass represents the predominant fraction in terms of mass.

When disposing of the exhausted panel, the separation of the different materials is a problem in economic and environmental terms. Thermal and/or chemical processes are available that allow to degrade the EVA and therefore to separate the different layers of the panel. However, these processes involve the formation of toxic substances that require expensive cleaning treatments.

It is also possible to separate the glass from the other components mechanically. In this case, of course, there is no emission, but the glass grit that is obtained is contaminated, in particular by particles of EVA and silicon and, to a lesser extent, by metal fragments.

This contaminated grit, with its irregular granulometry, has no use to date, as the contaminants it contains undermine the possibility of its use as a secondary raw material. The glass obtained by melting the grit as such is homogeneous but unusable due to the high amount of contaminants. At present, therefore, the extra-clear glass scrap obtained from the disposal of photovoltaic panels must be landfilled, and therefore represents a considerable problem in economic and environmental terms.

The need is therefore felt to provide a method for recycling glass scrap from photovoltaic panels and, more generally, glass scrap containing organic and inorganic contaminants with the production of soluble and insoluble silicates.

Processes for recovering metals from exhausted photovoltaic panels are known; see for example Journal of the Air & Waste Management Association, 64(7):797-807, 2014; and patent document US 2011/262339. However, there are no publications on obtaining industrial-degree soluble and insoluble silicates in water or alkaline solutions with a granulometry of less than 1 µm.

Processes are also known that are specifically aimed at recovering the lead contained in so-called leaded glass, which, however, are not used in photovoltaic panels.

WO 2017/162757 A1 (EVHSRL [IT]), 28 Sep. 2017, describes a specific process that enables an essentially complete recovery of lead from the cathode-ray tubes of televisions, in addition to the recovery of soluble silicates present in the original glass. This process is not applicable to the recycling of extra-clear glass scrap, contaminated by organic contaminants, obtained from photovoltaic panels, in which lead is practically not present.

US 2017/275734 A1 (Modica Giovanni [IT]), 28 Sep. 2017, describes a specific hydrothermal process that allows the recovery of lead contained in the rear portion (funnel) of the traditional cathode-ray tubes of old televisions. This process is not applicable to the recycling of extra-clear glass scrap, contaminated by organic contaminants, obtained from photovoltaic panels, in which lead is practically not present.

EP 2455500 A1 (Costech Internat SPA [IT]), 23 May 2012, describes a specific process for recovering lead, in the form of sulphide, from cone glass resulting from the disposal of cathode-ray tubes of televisions. This process is not applicable to the recycling of extra-clear glass scrap, contaminated by organic contaminants, obtained from photovoltaic panels, in which lead is practically not present.

SUMMARY

The object of the present invention is therefore to overcome the drawbacks highlighted above with respect to the prior art.

In particular, a task of the present invention is to provide a method for recycling contaminated glass scrap, in particular from organic contaminants, typically for recycling glass scrap from photovoltaic panels, wherein said glass scrap is substantially free of lead and/or boron.

Furthermore, a task of the present invention is to provide a method for recycling the above contaminated glass scrap which is economically and environmentally advantageous.

Again, a task of the present invention is to provide soluble industrial-degree silicates which are obtained from glass scrap containing organic contaminants, in particular from the above-mentioned glass scrap from photovoltaic panels.

Finally, a task of the present invention is to provide silicates with a granulometry of less than 1 μm, insoluble in water and in alkaline solutions.

These and other objects and tasks of the present invention are achieved by a method according to claim 1. Further characteristics are identified in the dependent claims. All appended claims form an integral part of the present disclosure.

In accordance with a first aspect, the invention relates to a method for recycling glass scrap from exhausted photovoltaic panels containing organic contaminants and substantially free of lead, comprising the steps of:
  providing exhausted photovoltaic panels;
  obtaining glass scrap from exhausted photovoltaic panels;
  grinding the glass scrap;
  treating the ground scrap with an aqueous solution of sodium hydroxide (NaOH) at suitable temperature and pressure and time, for obtaining a solid fraction and a liquid fraction;
  separating the solid fraction from the liquid fraction by means of filtration; and
  adding to the liquid fraction organic or inorganic chelating agents.

"Glass scrap" according to the present invention means glass grit obtained by peeling off the front layer of an exhausted photovoltaic panel, containing EVA as an organic contaminant.

As an example of the composition of the glass scrap to be treated, consider Table 1 below.

TABLE 1

| Oxide | % |
| --- | --- |
| $Al_2O_3$ | 0.34-1.22 |
| $Fe_2O_3$ | 0.032-0.062 |
| $TiO_2$ | 0.02-0.03 |
| CaO | 8.82-9.90 |
| MgO | 1.9-4.26 |
| $K_2O$ | 0.05-0.43 |
| $Na_2O$ | 13.1-13.8 |
| BaO | <0.1 |
| PbO | <262 ppm |
| $SiO_2$ | 73 |

As already indicated above, from the average composition of said glass scrap reported in Table 1 above, it is clear that lead (in this case in the form of lead oxide) is substantially not present. In fact, in this case it is present in an amount of less than 262 ppm.

Advantageously, the above-mentioned glass scrap is obtained from exhausted photovoltaic panels by cold mechanical separation.

In a preferred aspect of the present invention, the glass scrap is ground until a granulometry of about 1 mm is obtained. From the operational point of view in the method of the present invention, the aqueous NaOH solution is 30% by weight, while with regard to the conditions of the method, as a function of the granulometry:
  the process temperature is preferably comprised between 210° C. and 235° C., more preferably 230° C.; and/or
  the process pressure is preferably comprised between 18 and 28 bar, more preferably 23 bar; and/or
  the reaction time is preferably comprised between 60 and 120 minutes, more preferably 90 minutes.

The step of separating the solid fraction from the liquid fraction can be achieved by any one of the methods known in the art, but in a particularly preferred aspect this is achieved by means of a filter press.

A peculiar aspect of the method of the present invention is the sequestration of the cations from the liquid phase which may occur through chelating agents that may be organic or inorganic. Preferably inorganic phosphonates or ethylenediaminetetraacetic acid (EDTA) can be used as chelating agents. Phosphonates are particularly preferred.

The method of the present invention is effective when the organic component present in the glass scrap is minimal compared to the sum of the total components. In an advantageous aspect, the organic contaminant is EVA (Poly-Ethylene-Vinyl-Acetate) and is preferably in an amount less than 2% by weight compared to the total solid.

With the method of the present invention, mixed liquid sodium silicates and mixed solid silicates are obtained in a ratio that is preferably 3 to 1, further characterized in that the ratio between the liquid fraction and the solid fraction is 3 to 1.

In accordance with a second aspect, the invention relates to soluble silicates, obtained as a liquid fraction treated with the chelating agents, of industrial degree having a ratio R comprised between 1.75 and 2.00, where R is understood as the molar ratio Silica/Sodium oxide.

In accordance with a third aspect, the invention concerns silicates insoluble in water and in alkaline solutions with a granulometry of about 1 micron and containing oxides of Calcium, Magnesium, Barium, Aluminium, Titanium, Iron, Sodium, Potassium and Silica.

Further features and advantages of the present invention will be more evident from the description of the accompanying drawings.

BRIEF DESCRIPTION OF THE DRAWINGS

The invention is described hereinbelow with reference to certain examples provided by way of non-limiting example and illustrated in the accompanying drawings. These drawings illustrate different aspects and embodiments of the present invention and reference numerals illustrating structures, components, materials and/or similar elements in different drawings are indicated by similar reference numerals, where appropriate. Moreover, for clarity of illustration, certain references may not be repeated in all drawings.

DETAILED DESCRIPTION OF THE EMBODIMENTS

Figure 1:
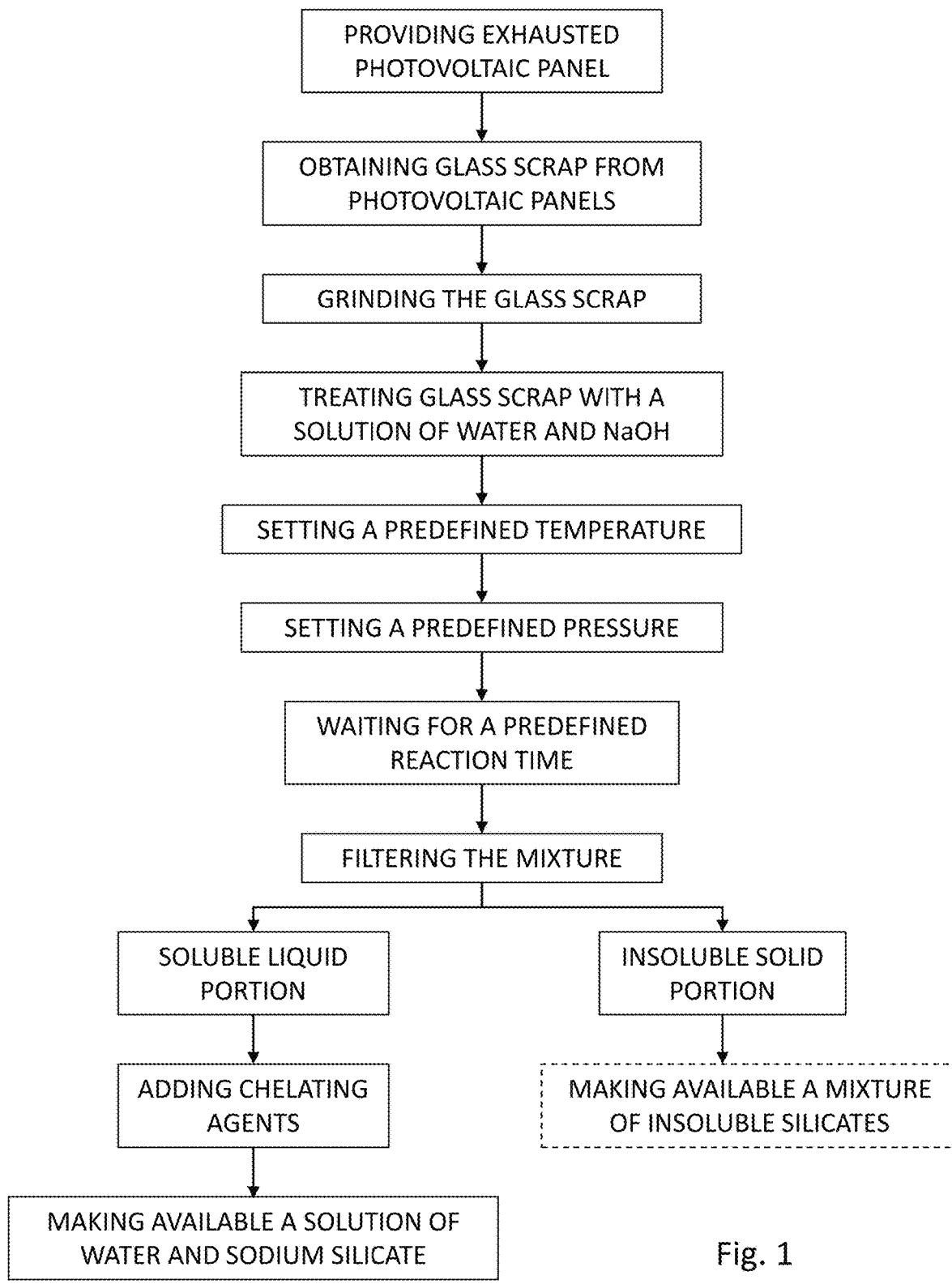
FIG. 1 is a block diagram representing the method of the invention.

While the invention is susceptible to various modifications and alternative constructions, certain preferred embodiments are shown in the drawings and are described hereinbelow in detail. It must in any case be understood that there is no intention to limit the invention to the specific embodiment illustrated, but, on the contrary, the invention intends covering all the modifications, alternative and equivalent constructions that fall within the scope of the invention as defined in the claims.

The description deals in detail with the peculiar aspects and the technical characteristics of the invention, while the aspects and the technical characteristics per se known can only be hinted at. In these respects, the same applies as reported above with reference to the prior art.

The use of "for example", "etc.", "or" indicates non-exclusive alternatives without limitation, unless otherwise indicated. The use of "comprises" and "includes" means "comprises or includes, but not limited to", unless otherwise indicated.

The invention defines a process flow with respect to which the terms "upstream", "before" and the like are unambiguously defined as opposed to the terms "downstream", "after" and the like.

The invention relates to a method for recycling glass scrap from exhausted photovoltaic panels containing organic contaminants and substantially free of lead, comprising the steps of:
  providing exhausted photovoltaic panels;
  obtaining glass scrap from exhausted photovoltaic panels;
  grinding the glass scrap;
  treating the ground scrap with an aqueous solution of sodium hydroxide (NaOH) at suitable temperature and pressure and time, for obtaining a solid fraction and a liquid fraction;
  separating the solid fraction from the liquid fraction by means of filtration; and
  adding to the soluble fraction organic or inorganic chelating agents.

Advantageously, the method comprises the preliminary step of preparing glass scrap containing organic and inorganic contaminants. Preferably the glass scrap is derived from exhausted photovoltaic panels.

In this case, the glass scrap of the type suitable for the present invention is the one deriving from the high quality glass sheet which constitutes the upper cover of the panel. This glass is called hereinbelow, in short, extra-clear glass. To obtain this scrap from the exhausted panel, it is therefore necessary to separate the upper glass from the other components of the panel, typically from the silicon cells, from the metal conductive tracks and from the EVA that seals and glues the whole. Separation can take place by different methods. Within the scope of the present invention, separation is preferably performed by cold mechanical processes. The application of solvents or heat, in fact, while making this step easier, both have disadvantages. The application of solvents involves considerable complications from the point of view of environmental safety, while the application of heat requires considerable energy expenditure. For this reason, within the scope of the present invention, cold mechanical separation is preferable, also in light of the excellent results that can be obtained and which will be described further in greater detail.

The cold mechanical separation of extra-clear glass allows to obtain an irregular grit contaminated by EVA, silicon and small metal parts. As already pointed out in the introductory part, this grit cannot be delivered to glassmaker as such, since the presence of contaminants degrades the quality of the glass obtained, making it unusable for the most common industrial standards.

The tests carried out by the Applicant have shown that this cold mechanical separation process allows the EVA residue to be kept within 2%, preferably within 1%. A higher percentage of EVA in the glass scrap would imply problems whereby the method of the invention would have to be radically revised.

It should be noted that although extra-clear glass deriving from exhausted photovoltaic panels is specifically considered here, this origin is not the only possible one for the starting glass scrap of the method of the invention. The origin from photovoltaic panels is particularly interesting for the volumes involved, but other origins are possible for the scrap. For example, scrap deriving from laminated glass sheets can be used, wherein a plurality of layers of extra-clear glass are joined together by EVA films that hold the sheet together even in the event of breakage.

As already pointed out in detail above, an important requirement for glass to be recycled according to the invention is that it does not contain lead or boron except for limited quantities, e.g. within a few parts per million; for example, in an average amount of less than 280 ppm; preferably, less than 265 ppm; even more preferably, less than 262 ppm.

The irregular glass grit obtained by cold mechanical separation must be ground for a regular and sufficiently fine granulometry to be obtained. As the person skilled in the art can well understand, the finer the granulometry of the ground scrap, the greater the surface area that the mass of glass exposes to the reagents it will encounter in the subsequent steps, facilitating the desired reactions. On the other hand, however, the finer the desired granulometry, the higher the mechanical energy to be invested and the costs to be incurred for the grinding process. For this reason, a granulometry with optimal compromise must be defined. Within the scope of the present invention, the Applicant's tests have shown that the optimal granulometry is obtained with a sieve of about 1 mm. As the person skilled in the art can well understand, this means that the actual granulometry of the ground scrap is comprised within 1 mm and can be expressed with a Gaussian curve in which most of the fragments are comprised between 0.4 mm and 0.6 mm. In this discussion, this granulometry is called "1 mm" for simplicity's sake.

After the step of grinding the glass scrap, the method can advantageously comprise the step of providing a reactor. The preferred reactor for the method of the invention is a container configured so that it can contain pressurized fluids and it can be heated and cooled as needed. Furthermore, it is preferable that the reactor allows keeping its contents under stirring.

The method of the invention then advantageously comprises the step of preparing a solution of water and sodium hydroxide, also commonly called caustic soda (NaOH). Preferably the solution comprises 30% NaOH by weight. Solutions in which the NaOH concentration is slightly different from 30% may also be prepared, for example with a variation comprised within +5%. Such variations in concentration have in fact no negative effect on the method as a whole. However, the 30% concentration is particularly advantageous because it is the most commonly used form at which caustic soda is made commercially available.

A reaction mixture is obtained by immersing the ground glass scrap in the solution.

The tests carried out by the Applicant allowed defining optimal process parameters in terms of pressure and temperature. In particular, an optimal pressure and temperature have been identified. The optimal process pressure is comprised between 18 and 28 bar, preferably is 23 bar; the optimal process temperature is comprised between 210° C. and 235° C., preferably it is 230° C. As the person skilled in the art can well understand, such optimal parameters can be slightly modified, by introducing little effects into the method as a whole. However, these variation possibilities are limited to around the optimal values indicated above. By way of example, the temperature must necessarily remain below 235° C., since exceeding this limit the process will yield products completely different from those desired.

The step of waiting for a predefined reaction time may advantageously comprise the sub-step of keeping the reaction mixture stirring. The tests carried out by the Applicant, using the pressure and temperature parameters indicated above, led to the identification of a suitable reaction time preferably comprised between 60 and 120 minutes, preferably a reaction time of 90 minutes. As the person skilled in the art can well understand, the reaction time depends on several factors. For example, a reduction in granulometry may allow a reduction in the reaction time. Furthermore, a reduction in reaction time can be compensated for within certain limits by an increase in temperature and pressure.

During the time spent in the reactor, the silica ($SiO_2$), which accounts for a percentage comprised between about 70% and about 75% of the mass of the glass fraction, reacts with the caustic soda so as to obtain a mixture of various sodium silicates, having generic formula $Na_{2x}Si_yO_{2y+x}$. Similarly, any inorganic contaminant of the glass scrap, i.e. the pure silicon residue deriving from photovoltaic cells, is also transformed into sodium silicate, in exactly the same way as glass.

At the same time, the same process step also allows the decomposition of the organic contaminant fraction, typically EVA and, in some cases, PVF. These organic components give rise to water, sodium carbonate, carbon dioxide, and possibly insoluble silicates.

At the end of the reaction time, the reaction mixture must be cooled down. Cooling is necessary to avoid hazards deriving from handling a mixture at high temperature. For this reason, the temperature of the mixture at the end of the cooling step may preferably be below 80° C., even more preferably below 60° C.

Once the reaction mixture has cooled down, it is necessary to proceed with the filtration step. This step is preferably carried out by means of a filter press, in itself well known to the person skilled in the art. In a per se known manner, the filter press is a device configured to receive as input a dense solid-liquid mixture (in the form of slurry, or sludge) and to provide as output a solid phase, where all the insoluble solids gather that were in suspension, and a liquid phase, consisting of the solvent and of all the soluble components. In alternative embodiments, the filtration step may be carried out by means of other per se known industrial equipment configured to treat solid-liquid mixtures so as to separate the solid components from the liquid component.

A soluble fraction, in the liquid phase, and an insoluble fraction, in the solid phase, are thus obtained from the filtration step. The proportion between the liquid and solid fraction is about 3 to 1. From this point onwards, therefore, the method of the invention is split into two branches, both of which will be described in detail below.

The main branch of the method is the one concerning the liquid phase, which, as mentioned above, consists mainly of a solution of water and sodium silicates. Suspended in this mixture, however, there are also metal ions, in particular polyvalent cations. These ions must be treated to prevent them from interfering with other processes.

Within the scope of the method of the invention, the metal ions are removed by chelation. For this purpose, chelating agents are added to the solution of water and sodium silicates, i.e. suitable for capturing the polyvalent metal ions in a stable complex, so that they are no longer in a condition to react. The chelating agents may be organic or inorganic.

Based on the studies carried out by the Applicant, it is preferable that the chelating agents comprise phosphonates or phosphonic acids. A particularly advantageous chelating agent is sodium hexametaphosphate. Another chelating agent that allows obtaining good results is ethylenediaminetetraacetic acid (EDTA).

Phosphonates are added in limited amounts, comprised between about 0.2% and about 1% of the total. If EDTA is used, it can be added in an amount comprised between about 0.1% and about 0.8% of the total. The amount of chelating agents used depends on several factors, such as the salinity of the water and the origin of the contaminants present. In any case, once the polyfunctional cations are chelated, they become inactive and, while remaining in solution, have no effect.

What is thus obtained is an aqueous solution of sodium silicates. In particular, the solution obtained by the method of the invention has a sodium silicate concentration comprised between about 40% and about 45%. Furthermore, the sodium silicate mixture as a whole has a ratio R, i.e. the weight ratio between $SiO_2$ and $Na_2O$, comprised between 1.75 and 2.00. These $SiO_2/Na_2O$ concentration and ratio parameters identify what is also commercially known as waterglass or liquid glass.

Waterglass is of great commercial interest because it is used in a variety of areas, including, purely by way of example, the production of detergents, adhesives and binders, paints and other surface coatings, hard water softening and wastewater treatment processes, the preparation of cement, building materials, refractory materials, intumescent materials and foundry sands, in the paper, ceramic industry, in food preservation and in aquaculture.

Nowadays, the waterglass required for all the needs of the industry is produced from quartz sands. Quartz sands have the advantage that they contain over 99% silica, as opposed to 70-75% of the photovoltaic glass scrap used in the method of the invention. On the other hand, however, the use of quartz sands entails enormous disadvantages in environmental and economic terms. Such sands are in fact traditionally excavated from river beds, but this practice is less and less accepted by public opinion. In addition, sands are often collected in remote areas, and must therefore be transported, with high transport costs.

Unlike the known methods, the method of the invention therefore makes waterglass available at a competitive cost but above all with a high environmental sustainability compared to that produced from quartz sands. In fact, as can be clearly understood from the foregoing discussion, the production of waterglass using the method of the invention not only allows recycling a huge amount of glass that would otherwise be landfilled, but also does not require the use of substances that are polluting or hazardous to the environment, since water and caustic soda are sufficient.

With this process, the silicon present in the photovoltaic glass is solubilised and transformed into soluble sodium silicate. The organic substances present in the glass (in particular EVA, but Tedlar and Polyesters, as well) are degraded into gaseous substances ($CO_2$) and into simple substances that dissolve in soluble silicates but do not alter the properties thereof.

One of the uses of waterglass is in the preparation of the slip in the ceramic industry. The studies carried out by the Applicant have shown that chelating the cations, in particular by means of phosphonates, allows the waterglass of the invention to obtain a slip that presents a linear rheological curve, which characteristic is particularly important in industrial applications (see in this regard Examples 3 and 4 described in detail below).

The uses of the sodium silicates obtained with the process of the invention are incredibly varied and important. The following is a non-exhaustive list of possible areas of use for the sodium silicates of the invention: set accelerating agents for cements, water-based paints, products for waterproofing soil, products for impregnating and waterproofing cement, products for impregnating and restoring marble, products for bonding paper and cardboard, bleaching and de-inking products, deflocculating products for clayey mixtures, and water treatment products. Furthermore, the sodium silicates of the invention can be used for the production of silica gel, molecular sieves, colloidal and precipitated silica. The sodium silicates of the invention can be used as binders and fire retardants for wood and cork, for pelletising inorganic materials, as glass fibre binders, for impregnating porous materials and as binders for paints.

With regard to the solid phase obtained from the filtration step, it can preferably be washed with an aqueous NaOH mixture to recover the soluble silicates present therein. Also in this case it is therefore preferable to separate the solid fraction from the liquid fraction. The latter can be usefully recycled in the main reactor with new glass scrap. The solid fraction can instead be advantageously washed with water to remove the alkaline solution that impregnates it. The washing water, containing NaOH, can in turn be recycled in the main reactor. The solid fraction, at the end of the washing steps, comprises a mix of insoluble silicates, such as magnesium silicate, calcium silicate, potassium silicate, etc. Also these products are used industrially in many sectors. The insoluble silicates obtained by the method of the invention, in fact, can be used as fillers in clayey, cement mixtures, stuccoes, wall paints, and for the production of heat-absorbing and flame-retardant panels.

As the skilled person can certainly appreciate, the method of the invention allows recycling by far the largest portion of the material with which the photovoltaic panel is made, bringing it back into the circular economy.

The invention is described hereinbelow with reference to certain examples provided by way of non-limiting example.

Example 1

An example embodiment of the method of the invention is described in detail below. A 100 kg sample, ground to a 1 mm under-sieve fraction, consisting of the front glass obtained from dismantling solar panels was placed in a suitable pressure-resistant reactor equipped with a stirrer and mixed with kg 60 of 30% NaOH (100% NaOH content kg 18) and kg 20 of water. The ratio between the mass of glass and the mass of 100% NaOH is equal to 100/18=5.5. The mass was heated to a temperature of 230° C. and kept at this temperature for 90 minutes. The mass was cooled up to a temperature of 60° C. diluted with kg 18 of water and sent to a filter to separate the liquid from the solid phases. The solid phase was washed with kg 60 of 30% NaOH in order to remove the soluble silicates that impregnated it. The obtained solution was stored for use in a subsequent reaction. The solid phase was subsequently washed with 18 Kg of water in order to remove the alkaline solution that impregnated it and the resulting solution was stored for use in a subsequent reaction. Kg 36.7 of dry insoluble silicates and kg 158.6 of soluble silicate solution were recovered at a concentration of 50% with a $SiO_2/Na_2O$ weight ratio of 1.8. Sodium hexametaphosphate was added to the soluble silicates at a rate of 0.6%.

Example 2

Example of comparison demonstrating how the fusion heat treatments are not suitable for recycling the glass scrap of the invention.

A sample of extra-clear glass scrap coming from photovoltaic panels treatment was analysed. The material was also carefully observed with the aid of an optical microscope; it was found to consist of fragments of white glass of maximum dimensions of the order of a few millimetres. Inside the sample, the presence of irregularly shaped micro-fragments of dark-coloured material with, in some cases, traces of light metallic-looking tracks and a light metallic thin layer on the back side was detected; by X-ray microanalysis, it was possible to verify that the representative fragment is constituted by metallic silicon, the light traces by metallic silver with smaller amounts of other metals such as lead and aluminium, while the thin layer on the back side is constituted by metallic aluminium. Within the scrap sample, the presence of frequent small flaps of plastic material, to which glass fragments generally adhered, was also verified.

In order to verify the quality of the scrap as a secondary raw material for the glass industry, a representative portion of scrap of about 400 g was subjected to a melting cycle in an electric furnace; a platinum crucible was used to avoid any contamination from the refractory material that may occur when using silicon-alumina crucibles. The scrap was loaded into the hot furnace at 1200° C.; the temperature was then raised to 1550° C. and maintained at this value for about four hours. Finally, the temperature was lowered to 1450° C. and the glass was cast on a metal plate and annealed in an electric muffle furnace at 540° C.

The glass obtained by direct melting of the scrap sample as such exhibited a pronounced amber-yellow hue; observed with the aid of an optical microscope, however, it is homogeneous and free of inclusions (stones). The quantitative chemical composition of the glass, as determined by Wavelength Dispersive X-ray Fluorescence (WDXRF) spectrometry, is given in Table 2, expressed as % by weight of the oxides; the values of ferrous iron and sulphides determined by spectrophotometric analysis and the value of the redox ratio calculated as the $Fe+/Fe_{tot}$ percentage ratio are also given in the same table.

TABLE 2

| | % by weight |
|---|---|
| $SiO_2$ | 73.0 |
| $Al_2O_3$ | 1.22 |
| $Na_2O$ | 13.8 |
| $K_2O$ | <0.05 |
| MgO | 1.90 |
| CaO | 9.90 |
| $SO_3$tot | 0.13 |
| $Sb_2O_3$ | 0.20 |
| $Fe_2O_3$tot | 0.062 |
| $TiO_2$ | 0.02 |
| FeO | 0.0425 |
| $S_{2-}$ | 0.006 |
| Redox ratio | 76% |

The chemical composition determined corresponds to that of a sodium-silicate calcium glass; however, compared to the expected values for an extra-clear glass, some anomalies are noted such as a high total content of iron oxide ($Fe_2O_3$tot: 0.062% by weight) with significant amounts of ferrous iron (FeO 0.043% by weight) corresponding to a high redox ratio equal to 76% and the presence of sulphides ($S_2$ 0.006% by weight).

Table 3 shows the optical and colorimetric properties of the glass as determined by spectrophotometric analysis.

TABLE 3

Colorimetric characteristics of the glass obtained by melting the scrap reported according to "CIE Publication No. 15: 2004" and refer to a thickness of 5 mm.

|  | X | Y | Z |
|---|---|---|---|
| Tristimulus values | 71.6093 | 75.4913 | 62.0591 |
| Trichromatic coordinates | 0.3424 | 0.3609 | 0.2967 |
| Luminance (%) |  | 75.5 |  |
| Dominant wavelength (nm) |  | 573.8 |  |
| Purity (%) |  | 20.6 |  |
| Filter 350-450 nm (%) |  | 54.4 |  |

| CIE L*a*b* coordinates | |
|---|---|
| L* | 89.6226 |
| a* | −5.0287 |
| b* | 20.7729 |
| C | 21.3729 |
| h | 103.6084 |

On the basis of the results obtained, it can therefore be concluded that the colouring of the glass is due to the combination of two effects: contamination of the scrap with iron, presumably due to the machinery used in the processing of the scrap, which brings the total iron content, expressed as $Fe_2O_3$, to over 600 ppm, i.e. a value about 3-4 times higher than the concentration of the extra-clear glasses normally used in photovoltaic panels; but this colouring is mainly due to the presence of organic contaminant and, to a lesser extent, of metal fragments that, during melting, behave as reducing agents favouring the formation of sulphides and the consequent development of the amber chromophore responsible for the yellow colouring, as confirmed by the value of the redox ratio and by the presence of sulphides in the glass.

Example 3

Figure 2:
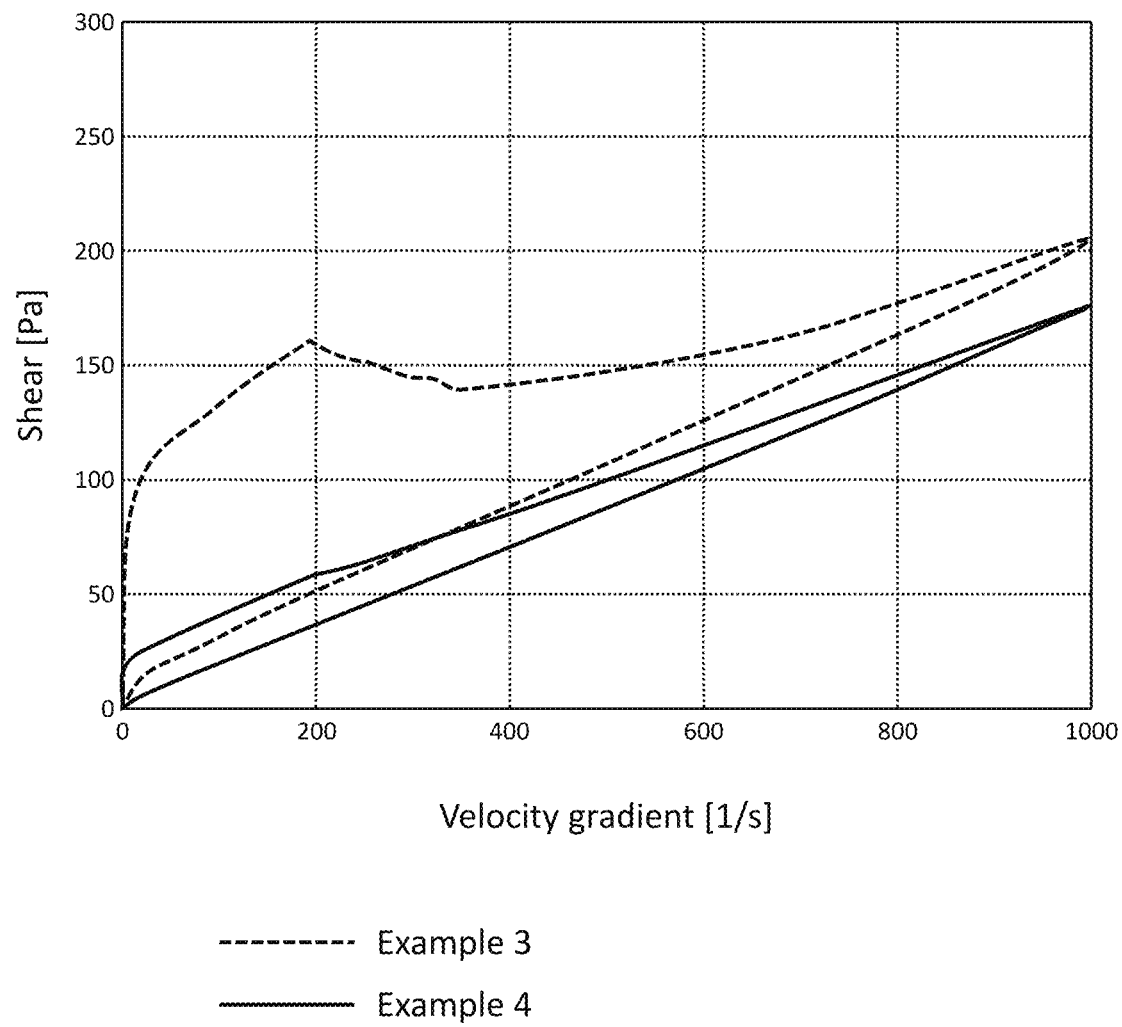
FIG. 2 schematically represents the rheological curves of two different slips referred to in Examples 3 and 4.

A process entirely similar to that described in Example 1 was carried out, with the only difference that no chelating agent was added to the soluble silicates obtained. The soluble silicates thus obtained were used to obtain a slip intended for the production of ceramics. The characteristics of the slip thus obtained have therefore been studied, in particular in terms of viscosity (which intuitively indicates the resistance that a fluid opposes to its flowing) and of flowing limit (i.e. the value of the minimum force that must be applied to a fluid to start its motion). These parameters are of fundamental importance for verifying the possibility of using the slip on an industrial level. The behaviour of the slip is defined in detail by the relative rheological curve which shows on the vertical axis of the ordinates the value of the shear stress (i.e. the value of the stress applied to the fluid to generate a movement) and on the horizontal axis of the abscissae the speed gradient (i.e. the physical quantity relative to the speed of movement of the fluid). In a manner known per se, the rheological curve often has an outward stretch, obtained by increasing the applied stress, a return stretch, obtained by decreasing the stress. The rheological curve of the slip obtained in Example 3 is shown qualitatively by the dashed line of FIG. 2. As the person skilled in the art can well understand, this rheological curve shows that the slip has a strongly non-linear behaviour and that it is therefore not suitable for industrial use for the production of ceramics.

Example 4

The process described in Example 1 was completed such that, unlike to what was done in Example 3, sodium hexametaphosphate was added to the soluble silicates as chelating agent to the extent of 0.6%. The soluble silicates thus obtained were used to obtain a slip intended for the production of ceramics. The characteristics, in particular the viscosity and flowing limit, of the resulting slip were then studied. The rheological curve of the slip obtained in Example 4 is shown qualitatively by the solid line of FIG. 2. As the person skilled in the art can well understand, this rheological curve has a very regular behaviour, almost ideal, and is therefore perfectly suitable for industrial use for the production of ceramics.

As the skilled person can well understand, the invention overcomes the drawbacks highlighted above in relation to the known technique.

In particular, the invention provides a method for recycling contaminated glass scrap, in particular contaminated from organic contaminants, and substantially lead-free, typically for recycling glass scrap from photovoltaic panels.

Furthermore, the invention provides a method for recycling the above contaminated glass scrap which is economically and environmentally sustainable.

Furthermore, the invention provides a secondary raw material suitable for industrial use obtained from glass scrap containing organic contaminants, in particular from glass scrap from photovoltaic panels.

In conclusion, all the details can be replaced by other technically equivalent elements; the characteristics described in relation to a specific embodiment can also be used in the other embodiments; the materials used, as well as the contingent shapes and dimensions, can be any according to the specific implementation needs without leaving the scope of protection of the following claims.

The invention claimed is:

1. A method for recycling glass scrap from exhausted photovoltaic panels containing organic contaminants, the method comprising the steps of:
   obtaining glass scrap from exhausted photovoltaic panels, wherein the amount of lead present in said glass scrap is less than 280 ppm;
   grinding the glass scrap;
   treating the ground scrap with an aqueous solution of sodium hydroxide (NaOH) at a predetermined temperature, pressure, and time, to obtain a solid fraction and a liquid fraction;
   separating the solid fraction from the liquid fraction by filtration; and
   adding to the liquid fraction organic or inorganic chelating agents.

2. The method according to claim 1, wherein the glass scrap is obtained from the exhausted photovoltaic panels by cold mechanical separation.

3. The method according to claim 1, wherein the glass scrap is ground to a granulometry of 1 mm.

4. The method according to claim 1, wherein the aqueous solution of NaOH is 30 wt %.

5. The method according to claim 1, wherein the temperature is between 210° C. and 235° C.

6. The method according to claim 1, where the temperature is 230° C.

7. The method according to claim 1 wherein the pressure is between 18 bar and 28 bar.

8. The method according to claim 1, wherein the pressure is 23 bar.

9. The method according to claim 1, wherein the reaction time is between 60 minutes and 120 minutes.

10. The method according to claim 1, wherein the reaction time is 90 minutes.

11. The method according to claim 1, wherein the step of separating the solid fraction from the liquid fraction is obtained by a filter press.

12. The method according to claim 1, wherein the chelating agents comprise phosphonates, phosphonic acids, or ethylenediaminetetraacetic acid (EDTA).

13. The method according to claim 1, wherein the lead content, expressed as PbO, contained in the glass scrap is less than 265 ppm.

14. The method according to claim 1, wherein the ratio between the liquid fraction and the solid fraction is 3 to 1.

15. The method according to claim 1, wherein, in the step of treating the ground scrap with an aqueous NaOH solution, the ratio between the mass of glass and the mass of 100% NaOH is equal to 100/18=5.5.

16. The method according to claim 1, wherein the organic contaminant in the glass scrap is EVA (Ethylene Vinyl Acetate).

17. The method according to claim 16, wherein the EVA is present in the glass scrap in an amount less than 2% by weight of the total solid.

\* \* \* \* \*